(12) United States Patent
Osawa et al.

(10) Patent No.: US 10,677,732 B2
(45) Date of Patent: Jun. 9, 2020

(54) DETECTION CHIP, DETECTION KIT, DETECTION SYSTEM, AND METHOD FOR DETECTING DETECTION TARGET SUBSTANCE

(71) Applicant: Konica Minolta Inc., Tokyo (JP)

(72) Inventors: Chie Osawa, Hino (JP); Akihiro Maezawa, Hino (JP); Makoto Mochizuki, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/017,579

(22) Filed: Jun. 25, 2018

(65) Prior Publication Data

US 2019/0003968 A1  Jan. 3, 2019

(30) Foreign Application Priority Data

Jun. 30, 2017  (JP) .................. 2017-129339

(51) Int. Cl.
*G01N 21/64* (2006.01)

(52) U.S. Cl.
CPC ....... *G01N 21/648* (2013.01); *G01N 21/6428* (2013.01); *G01N 2021/6439* (2013.01); *G01N 2021/6482* (2013.01)

(58) Field of Classification Search
None
See application file for complete search history.

(56) References Cited

U.S. PATENT DOCUMENTS

2008/0213814 A1* 9/2008 Gerion .................. C12Q 1/001
                                                         435/21
2010/0035335 A1  2/2010 Lakowicz et al.

FOREIGN PATENT DOCUMENTS

JP  2015-038515 A  2/2015

OTHER PUBLICATIONS

Extended European Search Report dated Aug. 14, 2018 from corresponding European Application No. 18174242.0.

* cited by examiner

*Primary Examiner* — Rebecca M Giere
(74) *Attorney, Agent, or Firm* — Lucas & Mercanti, LLP (57) ABSTRACT

A detection chip includes: a liquid container; and a light-transmitting substrate in which one of two surfaces facing each other faces an inside of the liquid container and an LSPR structure that generates localized surface plasmon resonance by light irradiation is disposed on the other surface of the two surfaces or in a region sandwiched between the one surface and the other surface.

20 Claims, 8 Drawing Sheets

DETECTION CHIP, DETECTION KIT, DETECTION SYSTEM, AND METHOD FOR DETECTING DETECTION TARGET SUBSTANCE

CROSS-REFERENCE TO RELATED APPLICATIONS

The entire disclosure of Japanese patent Application No. 2017-129339, filed on Jun. 30, 2017, is incorporated herein by reference in its entirety.

BACKGROUND

Technological Field

The present invention relates to a detection chip, a detection kit, a detection system, and a method for detecting a detection target substance.

Description of the Related Art

In a clinical test or the like, if a small amount of detection target substance such as a protein or DNA is detected, and the amount thereof can be quantitatively measured with high sensitivity, a treatment can be performed by recognizing a patient's condition rapidly. Therefore, a method capable of detecting a small amount of detection target substance quantitatively with high sensitivity has been desired.

As a method for detecting a detection target substance or measuring the amount thereof with high sensitivity, surface plasmon-field enhanced fluorescence spectroscopy (hereinafter referred to as "SPFS") is known. SPFS detects a substance by using surface plasmon resonance (hereinafter referred to as "SPR") generated by irradiating a metal film or the like with light under predetermined conditions, and measures the amount thereof (hereinafter, simple "detecting" also means measuring the amount).

Figure 9A:
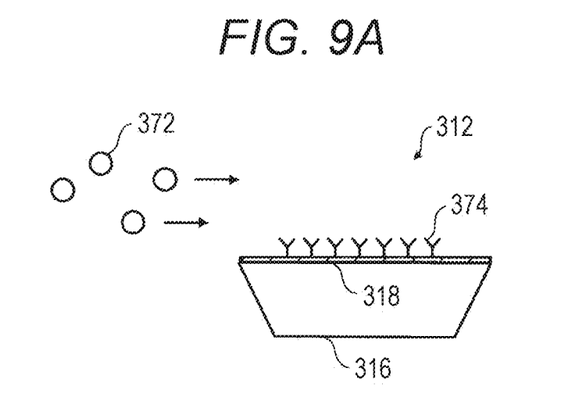
FIGS. 9A to 9C are schematic diagrams illustrating an outline of conventional substance measurement by SPFS.
Figure 9B:
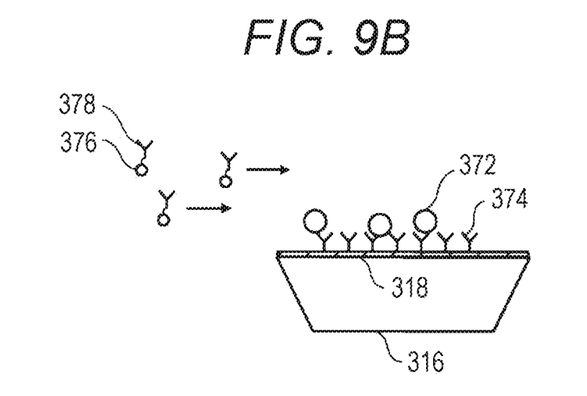
Figure 9C:
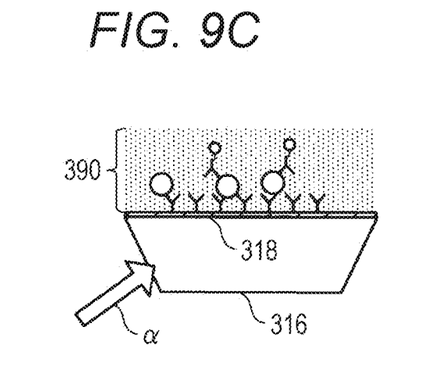

FIGS. 9A to 9C are schematic diagrams illustrating an outline of conventional substance measurement by SPFS. In the conventional substance measurement by SPFS, a detection chip inducing a liquid container 312, a prism 316 as a substrate, a metal film 318 formed on a surface of the prism 316, and a first capturing body (for example, a primary antibody) 374 that can be specifically bonded to a detection target substance 372, fixed onto the metal film 318, is used. If a sample liquid containing the detection target substance 372 is supplied to a detection field which is the liquid container 312 on a side closer to the metal film 318 than the prism 316 (FIG. 9A), the detection target substance 372 is captured by the first capturing body 374 in the detection field. Thereafter, if a second capturing body (for example, a secondary antibody) 378 labeled with a fluorescent substance 376 is supplied to the detection field (FIG. 9B), the detection target substance 372 bonded to the detection field is labeled with the fluorescent substance 376. If the metal film 318 is irradiated with excitation light α from the prism 316 side (the opposite side to the detection field) in this state (FIG. 9C), the fluorescent substance 376 that labels the detection target substance 372 is excited by an electric field 390 enhanced by SPR to emit fluorescence. By detecting this fluorescence, the detection target substance 372 can be detected, and the amount thereof can be measured. In SPFS, a fluorescent substance is excited by an electric field enhanced by SPR, and therefore it is possible to detect and measure a detection target substance with high sensitivity.

JP 2015-038515 A describes a localized surface plasmon resonance sensor chip having a nano-sized uneven structure on a detection field side of the metal film 318 in the substance measurement by SPFS. According to JP 2015-038515 A, an electric field enhancement region by localized surface plasmon resonance (hereinafter abbreviated as "LSPR") is positioned at several tens nm from a substrate surface and can be narrower than an electric field enhancement region (about 200 nm from a substrate surface) by propagation surface plasmon resonance having no uneven structure. Therefore, it is possible to reduce noise due to a floating substance.

As described in JP 2015-038515 A, a conventional electric field enhancement region by SPR is positioned at about 200 nm from a surface of a substrate (metal film). Therefore, it is necessary to design the particle diameter of a fluorescent substance, the size of a primary antibody, and the like such that the fluorescent substance is also positioned at 200 nm or less from the surface of the substrate, and the types of the fluorescent substance and the primary antibody to be used and the like are limited. Meanwhile, if the electric field enhancement region becomes wider, it is expected that a wider variety of fluorescent substances and primary antibodies will be able to be used, the number of substances detectable and measurable by SPFS will increase, and detection and measurement by SPFS will become easier. In addition, SPFS cannot be used for detection and measurement of a protein attached to a surface of a cell because the size of a cell is usually about several tens μm.

SUMMARY

The present invention has been achieved in view of the above problems. An object of the present invention is to provide a detection chip and a detection kit capable of detecting and measuring a detection target substance by SPFS even in a region further apart from a surface of a substrate by widening an electric field enhancement region, a detection system capable of detecting a detection target substance using the detection chip, and a method for detecting a detection target substance using the detection chip.

To achieve the abovementioned object, according to an aspect of the present invention, a detection chip reflecting one aspect of the present invention comprises: a liquid container; and a light-transmitting substrate in which one of two surfaces facing each other faces an inside of the liquid container and an LSPR structure that generates localized surface plasmon resonance by light irradiation is disposed on the other surface of the two surfaces or in a region sandwiched between the one surface and the other surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment (Detection System)

Figure 1:
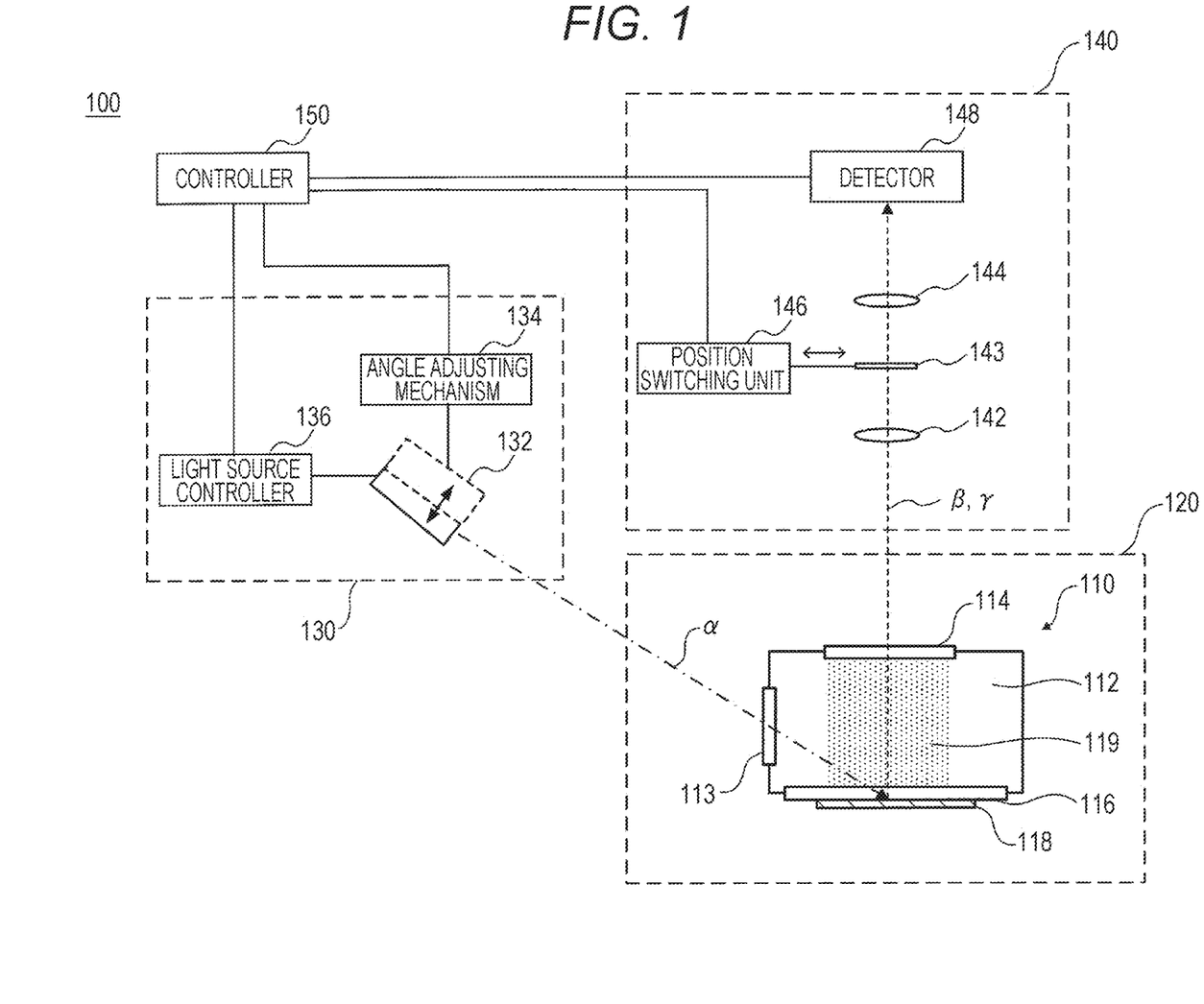
FIG. 1 is a schematic diagram illustrating the configuration of a detection system according to a first embodiment of the present invention.

FIG. 1 is a schematic diagram illustrating the configuration of a detection system 100 according to a first embodiment of the present invention. The detection system 100 includes a chip holder 120 for disposing a detection chip 110 including a liquid container 112 and a light-transmitting substrate 116, a light source unit 130, a detection unit 140, and a controller 150. The detection system 100 irradiates an LSPR structure 118 of the detection chip 110 with excitation light $\alpha$ such that the LSPR structure 118 generates LSPR in a state where the detection chip 110 is attached to a predetermined position of the chip holder 120 and generates an enhanced electric field based on LSPR on a side closer to the liquid container 112 than the LSPR structure 118. By exciting a fluorescent substance present in the liquid container 112 by the enhanced electric field and detecting fluorescence $\beta$ emitted from the fluorescent substance, a detection target substance in a specimen is detected and the amount thereof is measured.

The detection chip 110 includes the liquid container 112 and the light-transmitting substrate 116.

The liquid container 112 may be a space (well) in which a liquid can be temporarily stored or a flow path through which a liquid can flow. The liquid container 112 is preferably a flow path from a viewpoint of improving efficiency of detection and measurement.

For example, the liquid container 112 only needs to be able to dispose the substrate 116 on a part of a side surface thereof. In the detection system 100 illustrated in FIG. 1, the liquid container 112 is a lid member having a groove formed on an inner surface thereof. When the lid member is combined with the substrate 116, a flow path in which the substrate 116 serves as a bottom surface and the lid member serves as a side surface and an upper surface is formed. Note that the liquid container 112 may be a flow path having an opening at both ends or one end thereof or a well constituted by a recessed portion with a bottom, having an opening capable of disposing the substrate 116 formed in a part of a side surface thereof. In addition, the liquid container 112 may be a flow path having an opening at both ends or one end thereof or a well constituted by a recessed portion with a bottom, capable of disposing the substrate 116 therein.

The liquid container 112 includes an excitation light transmitting portion 113 formed of a material capable of transmitting the excitation light $\alpha$ in another part of the side surface thereof. The excitation light transmitting portion 113 is a transmission window for guiding the excitation light $\alpha$ emitted from a light source unit 130 to the substrate 116 disposed in the detection chip 110. The excitation light transmitting portion 113 only needs to be formed in a region of the side surface of the liquid container 112 in which the excitation light $\alpha$ can be incident on an incident surface 118$a$ at an angle (hereinafter also simply referred to as "enhancement angle") at which the light quantity of scattered light (hereinafter simply referred to as "plasmon scattered light") $\gamma$ having the same wavelength as the excitation light $\alpha$ emitted to an upper side of the detection chip 110 by irradiating an interface between the LSPR structure 118 and the substrate 116 (hereinafter simply referred to as "incident surface") 118$a$ (see FIGS. 5A and 5B) is maximum. However, the whole of the liquid container 112 may be the excitation light transmitting portion 113 made of a material capable of transmitting the excitation light $\alpha$.

In the detection system 100 illustrated in FIG. 1, the excitation light transmitting portion 113 is disposed at a position where the excitation light $\alpha$ is incident on the liquid container 112 (a cross-sectional view is illustrated in FIG. 1) which is a flow path for causing a liquid to flow from the back of the drawing to the front thereof obliquely from a side direction to a liquid flowing direction. Note that the excitation light transmitting portion 113 may make the excitation light $\alpha$ incident on the liquid container 112 obliquely in the same direction as (or in the opposite direction to) the liquid flowing direction.

The liquid container 112 includes a fluorescence transmitting portion 114 made of a material capable of transmitting the fluorescence $\beta$ emitted by a fluorescent substance excited by an enhanced electric field in still another part of the side surface thereof. The fluorescence transmitting portion 114 is a transmission window for guiding the fluorescence $\beta$ to a detection unit 140 outside the detection chip 110. For example, the fluorescence transmitting portion 114 only needs to be formed in a region facing the disposed substrate 116 on the side surface of the liquid container 112. However, the whole of the liquid container 112 may be the fluorescence transmitting portion 114 made of a material capable of transmitting the fluorescence $\beta$.

A region between the substrate 116 and the fluorescence transmitting portion 114 in the liquid container 112 serves as a detection field 119 for detecting and measuring a substance.

The fluorescence transmitting portion 114 and the excitation light transmitting portion 113 can be made of a material transparent to light, such as resin or glass.

The shape and the size of the liquid container 112 are not particularly limited as long as the inner diameter (interval between the substrate 116 and the fluorescence transmitting portion 114) in the detection field 119 is about several μm to several cm, for example.

The substrate 116 is a light-transmitting and dielectric substrate having two surfaces facing each other and made of a dielectric capable of transmitting the excitation light α. In the substrate 116, one of the two surfaces facing each other faces an inside of the liquid container 112. Note that the phrase "one of the two surfaces facing each other faces an inside of the liquid container 112" means that the one surface of the substrate 116 is disposed on an inner side of the liquid container 112. The one surface is preferably in contact with the inside of the liquid container 112. However, a material transmitting the excitation light α and an electric field amplitude may be sandwiched between the one surface and the inside of the liquid container 112. However, even in the latter case, a distance between the substrate 116 and the inside of the liquid container 112 is preferably small, and is preferably 1 μm or less, for example. The one surface is preferably flat.

The substrate 116 can be formed of a material transparent to light, such as resin or glass. The substrate 116 may be a prism.

Unlike a second embodiment described below, it is not necessary for the substrate 116 to have a capturing body (first capturing body) specifically bonded to a detection target substance fixed to the one surface. However, the first capturing body may be fixed to the one surface.

The substrate 116 includes the structure (hereinafter simply referred to as "LSPR structure") 118 that generates LSPR by irradiation with the excitation light α on the other surface of the two surfaces facing each other. The LSPR structure 118 is formed in at least a part of a region corresponding to the detection field 119 on the other surface or in a region sandwiched between the one surface and the other surface.

Figure 2A:
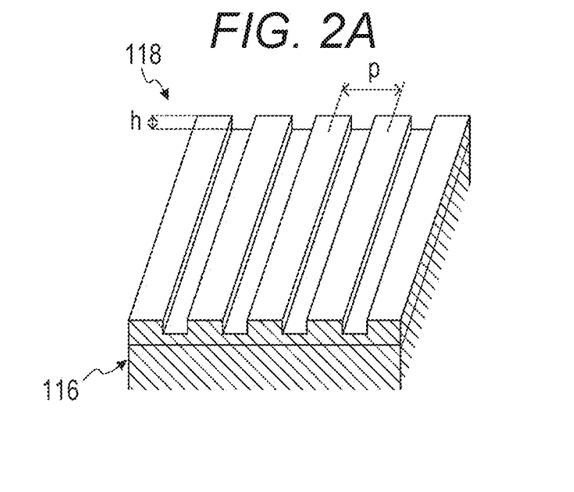
FIG. 2A is a schematic view illustrating an LSPR structure having a one-dimensional uneven structure including a plurality of protruding lines or protruding portions.
Figure 2B:
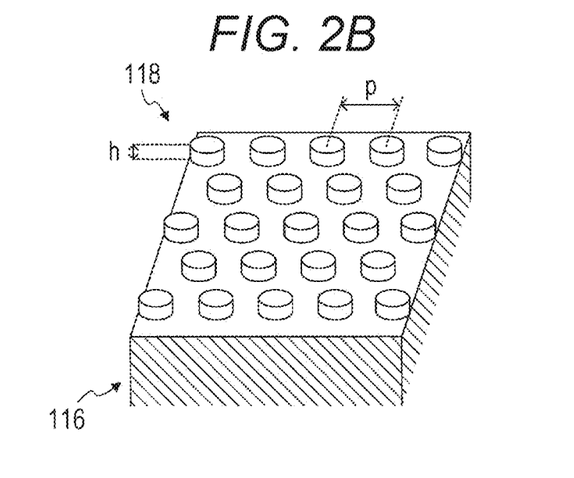
FIG. 2B is a schematic view illustrating an LSPR structure having a two-dimensional uneven structure including a plurality of protruding lines or protruding portions.
Figure 3:
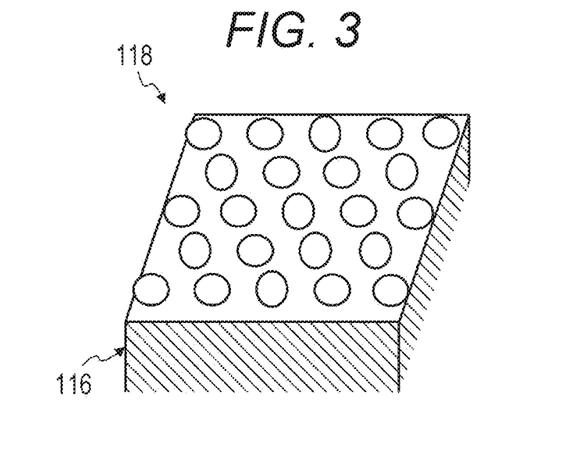
FIG. 3 is a schematic view illustrating an LSPR structure in which nano-sized particles are aggregated.

The LSPR structure 118 may be a structure having an uneven structure including a plurality of protruding lines or protruding portions as illustrated in FIGS. 2A and 2B or may be a structure in which nano-sized particles are aggregated as illustrated in FIG. 3. When being formed on the other surface, the LSPR structure 118 may be formed on the entire other surface or may be formed only on a part thereof.

When the LSPR structure 118 is formed in a region sandwiched between the one surface and the other surface, at least a part of the uneven structure or the nano-sized particles only needs to be present on a side closer to the other surface than a surface of the one surface. For example, the uneven structure or the nano-sized particles may be disposed such that all of them are located in a region sandwiched between the one surface and the other surface inside the substrate 116, may be disposed such that a part of them is located in a region sandwiched between the one surface and the other surface inside the substrate 116, or may be disposed such that all of them are located on an outer side of the substrate 116 than the other surface.

When the uneven structure or the nano-sized particles are disposed such that all of them are located in a region sandwiched between the one surface and the other surface inside the substrate 116, the height of the uneven structure or a particle diameter of each of the particles may be substantially the same as the length in a width direction of the substrate 116 (a distance between the one surface and the other surface), or the height of the uneven structure or the particle diameter of each of the particles may be smaller than the length in the width direction of the substrate 116. When the height of the uneven structure or the particle diameter of each of the particles is smaller than the length in the width direction of the substrate 116, the uneven structure or the nano-sized particles may be disposed at a position closer to the one surface inside the substrate 116 or may be disposed at a position closer to the other surface.

When the uneven structure or the nano-sized particles are disposed such that a part of them is located in a region sandwiched between the one surface and the other surface inside the substrate 116, the part may be disposed so as to be located outside the one surface or the other surface (or both surfaces).

When being irradiated with the excitation light α, the LSPR structure 118 generates LSPR to generate an enhanced electric field. The enhanced electric field is generated only in a range of about several tens nm on a front side of the LSPR structure 118 (the opposite side to irradiation with the excitation light α) but is generated even in a range of 100,000 nm (100 μm) on a back side of the LSPR structure 118 (the same side as irradiation with the excitation light α: incident surface 118a side). Therefore, by disposing the detection field 119 on a back side of the LSPR structure 118, a detection target substance can be detected in a wider range than in the past. Note that an enhanced electric field due to propagation surface plasmon resonance independent of LSPR is generated only in a range of about 200 nm from a surface of the structure. Therefore, when a detection target substance is detected on a back side of the LSPR structure 118 using an enhanced electric field by LSPR generated by the LSPR structure 118, the detection target substance can be detected in a wider range than in the past.

The uneven structure may be a one-dimensional uneven structure as illustrated in FIG. 2A or a two-dimensional uneven structure as illustrated in FIG. 2B. The one-dimensional uneven structure includes a plurality of protruding lines formed on a surface of the LSPR structure 118. The plurality of protruding lines is preferably arranged substantially parallel to each other at a predetermined interval on the surface of the LSPR structure 118. Note that the arrangement direction of the protruding lines is not particularly limited. The two-dimensional uneven structure includes a plurality of protruding portions formed on the surface of the LSPR structure 118. The plurality of protruding portions is preferably arranged substantially periodically on the surface of the LSPR structure 118. Examples of the arrangement of the protruding portions include a tetragonal lattice and a triangular (hexagonal) lattice. The shapes of the protruding lines and the protruding portions are not particularly limited, and examples thereof include a shape in which the cross-sectional shape of the LSPR structure 118 is a substantially rectangular wave shape, a substantially sinusoidal shape, or a substantially serrated shape.

Each of the protruding lines and the protruding portions preferably has a height of 5 nm or more. A protruding line or a protruding portion having a height of 5 nm or more can widen the enhanced electric field by LSPR and can further enhance a formed electric field. Note that, as illustrated in FIGS. 2A and 2B, the "height of the protruding line or the protruding portion" means a distance h between a bottom of the LSPR structure 118 (a portion of the LSPR structure 118 having the lowest height from the substrate 116) and a tip of the protruding line or the protruding portion (a portion of the LSPR structure 118 having the highest height from the substrate 116). The height of the protruding line or the protruding portion is more preferably 50 nm or more, and still more preferably 100 nm or more from the above viewpoint. An upper limit of the height of the protruding line or the protruding portion is not particularly limited but is preferably 1500 nm or less. The height can be measured using a known image analysis software based on an image obtained by cutting the substrate 116 on which the LSPR structure 118 is formed with a focused ion beam device (FIB) and imaging a cross section formed by imaging with a scanning electron microscope (SEM).

An interval between the protruding lines or between the protruding portions is preferably 50 nm or more and 2000 nm or less. If the interval is 100 nm or more and 2000 nm or less, the enhanced electric field by LSPR can be wider, and the formed electric field can be further enhanced. The interval between the protruding lines or between the protruding portions is more preferably 50 nm or more and 1500 nm or less, and still more preferably 50 nm or more and 800 nm or less from the above viewpoint. Note that the "interval between the protruding lines or between the protruding portions" means a distance p between the centers of the protruding lines or between the centers of the protruding portions in an arrangement direction of the protruding lines or the protruding portions as illustrated in FIGS. 2A and 2B. The interval can be measured using a known image analysis software based on an image obtained by imaging the LSPR structure 118 from a front side thereof using SEM.

The average thickness of the LSPR structure 118 having the uneven structure is not particularly limited but is preferably 30 nm or more and 70 nm or less.

The aggregate of the nano-sized particles only needs to have a structure in which nano-sized particles are aggregated as illustrated in FIG. 3. The nano-sized particles are preferably arranged substantially periodically on a surface of the LSPR structure 118. The shape of each of the nano-sized particles is not particularly limited but is preferably substantially spherical.

The nano-sized particles preferably have an average particle diameter of 5 nm or more and 1000 nm or less. Particles having an average particle diameter of 5 nm or more and 1000 nm or less can widen the enhanced electric field by LSPR and can further enhance the formed electric field. The average particle diameter of the nano-sized particles is more preferably 5 nm or more and 1000 nm or less, and still more preferably 50 nm or more and 800 nm or less from the above viewpoint. The average particle diameter can be measured using a known image analysis software based on an image obtained by imaging the LSPR structure 118 from a front side thereof using SEM.

In the aggregate of the nano-sized particles, a ratio (B/A) of an average particle diameter (A) of the nano-sized particles to an average (B) of distances between the nano-sized particles is preferably 0.3 or more and 3.0 or less. An aggregate of nano-sized particles having the ratio B/A of 0.3 or more and 3.0 or less can widen the enhanced electric field by LSPR and can further enhance the formed electric field. The ratio B/A is more preferably 0.5 or more and 2.0 or less, and still more preferably 0.8 or more and 1.3 or less from the above viewpoint. The average (B) of distances between the nano-sized particles can be a minimum value of distances between adjacent nano-sized particles, measured using a known image analysis software based on an image obtained by cutting the substrate 116 on which the LSPR structure 118 is formed with a focused ion beam device (FIB) and imaging a cross section formed by imaging with SEM.

Incidentally, the above description exemplifies the structure in which all of the uneven structure or the nano-sized particles included in the LSPR structure 118 are disposed so as to be located on an outer side of the substrate 116 than the other surface, but a similar uneven structure or similar nano-sized particles may be disposed in another position.

The LSPR structure 118 only needs to be formed of a material that can generate LSPR when the LSPR structure 118 is a nano-sized structure. Examples of the material of the LSPR structure 118 include gold, silver, copper, zinc, aluminum, gallium, alloys thereof, oxides thereof, oxide semiconductors containing these, titanium nitride (TIN), and indium oxide ($In_2O_3$). Among these materials, gold, silver, zinc oxide, titanium nitride, or indium oxide is preferably contained as a main component from viewpoints of further widening the enhanced electric field and further enhancing the formed electric field. Note that the phrase "contained as a main component" means that the content of the material is 50% by mass or more with respect to the total mass of the LSPR structure when quantification is performed using ICP.

Note that another layer made of a metal oxide or the like may be sandwiched between the substrate 116 and the LSPR structure 118.

The LSPR structure 118 can be manufactured by a known method.

The LSPR structure 118 having the uneven structure may be formed by forming a metal film on a surface of the substrate 116 and then imparting an uneven shape to the metal film or may be formed by forming a metal film on the surface of the substrate 116 to which an uneven shape has been imparted. The metal film can be formed by a known method including sputtering, vapor deposition, plating, and the like.

The LSPR structure 118 which is an aggregate of nano-sized particles can be formed by, for example, a Langmuir-Blodgett method (LB method). In the LB method, an amphiphilic molecule such as a long chain carboxylic acid and the nano-sized particles are diluted with a volatile and water-insoluble solvent such as toluene, and water is further added thereto to form a Langmuir film (L film) which is a monomolecular film of the nano-sized particles at an interface between water and the solvent. Thereafter, the substrate 116 immersed in the liquid in which the L film has been formed is withdrawn, and a Langmuir-Blodgett film (LB film) is formed by transferring the L film onto the substrate 116. The average particle diameter (A) of the nano-sized particles in the aggregate can be adjusted by the average particle diameter of the nano-sized particles diluted with a solvent. The average (B) of distances between the nano-sized particles in the aggregate can be adjusted by the concentration of the nano-sized particles in a solvent or the speed of withdrawing the substrate 116. The substrate 116 is desirably immersed in a solvent before addition of water.

Thereafter, for example, by a method for performing molding by further adding a material of the substrate so as to be in contact with the metal film having the uneven structure or the aggregate of nano-sized particles formed thereon, the substrate 116 in which the uneven structure or the aggregate of nano-sized particles is disposed in a region sandwiched between the one surface and the other surface can be formed.

The light source unit 130 irradiates the incident surface 118a of the LSPR structure 118 with the collimated excitation light α having a constant wavelength and a constant light quantity from the liquid container 112 side through the substrate 116. The light source unit 130 preferably emits the excitation light α such that an irradiation spot on the incident surface 118a is substantially circular. The light source unit 130 includes, for example, a light source 132 of the excitation light α, a beam shaping optical system, an automatic power control (APC) mechanism, a temperature adjusting mechanism (none of which are illustrated), an angle adjusting mechanism 134, and a light source controller 136.

The type of the light source 132 is not particularly limited but may be a laser diode (LD), a light emitting diode, a mercury lamp, or the like. The light source 132 is preferably a light source that emits a laser, particularly a laser beam from a viewpoint of improving efficiency of detection and measurement. In a case where light emitted from the light source 132 is not a beam, the light emitted from the light source 132 is desirably converted into a beam by a lens, a mirror, a slit, or the like. In a case where light emitted from the light source 132 is not monochromatic light, the light emitted from the light source 132 is desirably converted into monochromatic light by a diffraction grating or the like. In a case where light emitted from the light source 132 is not linearly polarized light, the light emitted from the light source 132 is desirably converted into linearly polarized light by a polarizer or the like.

For example, the beam shaping optical system includes a collimator, a bandpass filter, a linearly polarizing filter, a half-wave plate, a slit, and a zooming means. The beam shaping optical system may include all of these means or may include a part thereof. The collimator collimates the excitation light α emitted from the light source 132. The bandpass filter converts the excitation light α emitted from the light source 132 into narrow band light having only a center wavelength. This is because the excitation light α emitted from the light source 132 has a small wavelength distribution width. The linearly polarizing filter converts the excitation light α emitted from the light source 132 into completely linearly polarized light. The half-wave plate adjusts a polarization direction of the excitation light α such that a P-wave component is incident on the irradiation spot. The slit and the zooming means adjust the beam diameter of the excitation light α and the contour shape thereof such that the irradiation spot has a circular shape having a predetermined size.

The APC mechanism controls the light source 132 such that an output of the light source 132 is constant. More specifically, the APC mechanism detects the light quantity of light branching from the excitation light α with a photodiode (not illustrated) or the like. The APC mechanism controls an output of the light source 132 constantly by controlling input energy in a regression circuit.

Examples of the temperature adjusting mechanism include a heater and a Peltier element. The wavelength and energy of light emitted from the light source 132 may vary according to a temperature. Therefore, by keeping the temperature of the light source 132 constantly by the temperature adjusting mechanism, the wavelength and energy of light emitted from the light source 132 is controlled constantly.

The angle adjusting mechanism 134 adjusts the incident angle of the excitation light α with respect to the incident surface 118a (the interface between the LSPR structure 118 and the substrate 116) of the LSPR structure 118. The angle adjusting mechanism 134 rotates an optical axis of the excitation light α and the chip holder 120 relatively in order to emit the excitation light α toward a predetermined position of the incident surface 118a through the substrate 116 at a predetermined incident angle.

For example, the angle adjusting mechanism 134 rotates the light source unit 130 around an axis orthogonal to the optical axis of the excitation light α. At this time, the position of the rotational axis is set such that the position of an irradiation spot on the incident surface 118a is hardly changed even when scanning for an incident angle is performed.

As described above, among incident angles of the excitation light α with respect to the incident surface 118a of the LSPR structure 118, an angle at which the light quantity of the plasmon scattered light γ is maximum is an enhancement angle. By setting an incident angle of the excitation light α to the enhancement angle or an angle in the vicinity thereof, the fluorescence β having a higher intensity can be measured. Basic incident conditions of the excitation light α are determined by the material and the shape of the substrate 116, the shape and the material of the LSPR structure 118, the refractive index of a liquid in the liquid container 112, and the like. However, an optimum incident condition is varied slightly according to the type and the amount of a fluorescence substance in the liquid container 112, a shape error of the substrate 116, and the like. Therefore, an optimum enhancement angle is preferably determined for each detection and measurement.

The light source controller 136 controls various devices included in the light source unit 130 to control emission of the excitation light α from the light source unit 130. For example, the light source controller 136 is constituted by a known computer or microcomputer including a computing device, a control device, a storage device, an input device, and an output device.

The detection unit 140 detects the fluorescence β generated by irradiating an irradiation spot (LSPR structure 118) with the excitation light α. In addition, as necessary, the detection unit 140 also detects the plasmon scattered light γ generated by irradiating an irradiation spot (LSPR structure 118) with the excitation light α. The detection unit 140 includes, for example, a first lens 142, an optical filter 143, a second lens 144, a position switching unit 146, and a detector 148.

For example, the first lens 142 is a condenser lens, and condenses light emitted from the vicinity of the detection field 119. For example, the second lens 144 is an imaging lens, and images the light condensed by the first lens 142 on a light receiving surface of the detector 148. Optical paths between the two lenses are substantially parallel to each other. The optical filter 143 is disposed between the two lenses.

The optical filter 143 leads only a fluorescence component to the detector 148 and removes an excitation light component (plasmon scattered light γ) in order to detect the fluorescence β at a high S (signal)/N (noise) ratio. Examples of the optical filter 143 include an excitation light reflection filter, a short wavelength cut filter, and a bandpass filter. For example, the optical filter 143 may be a filter including a multilayer film that reflects a predetermined light component or a colored glass filter that absorbs a predetermined light component.

The position switching unit 146 switches the position of the optical filter 143 between a position on an optical path and a position outside the optical path between the first lens 142 and the second lens 144. Specifically, the optical filter 143 is disposed on the optical path when the detector 148 detects the fluorescence β, and the optical filter 143 is disposed outside the optical path when the detector 148 detects the plasmon scattered light γ.

The detector 148 is a light receiving sensor that detects the fluorescence β and the plasmon scattered light γ. The detector 148 has such high sensitivity to be able to detect the weak fluorescence β emitted from a small amount of detection target substance. The detector 148 may be, for example, a photomultiplier tube (PMT) or an avalanche photodiode (APD).

The detection system 100 may include a liquid supply unit that introduces various liquids into the liquid container 112 of the detection chip 110 or discharges various liquids from the liquid container 112 of the detection chip 110, such as a pipette, a vibrator that stirs a liquid in the liquid container 112 for efficiently perform bonding (primary reaction) between a detection target substance and the first capturing body, bonding (secondary reaction) between the detection target substance and the second capturing body, cleaning, and the like (all of which are not illustrated), and the like. The liquid supply unit, the vibrator, and the like are disposed at positions that do not interfere with the optical paths of the excitation light α, the fluorescence β, and the plasmon scattered light γ.

The controller 150 controls the light source unit 130, the angle adjusting mechanism 134, the position switching unit 146, the detector 148, and the like, as well as the liquid supply unit, the vibrator, and the like. For example, the controller 150 is constituted by a known computer or microcomputer including a computing device, a control device, a storage device, an input device, and an output device.

(Detection Method)

Figure 4:
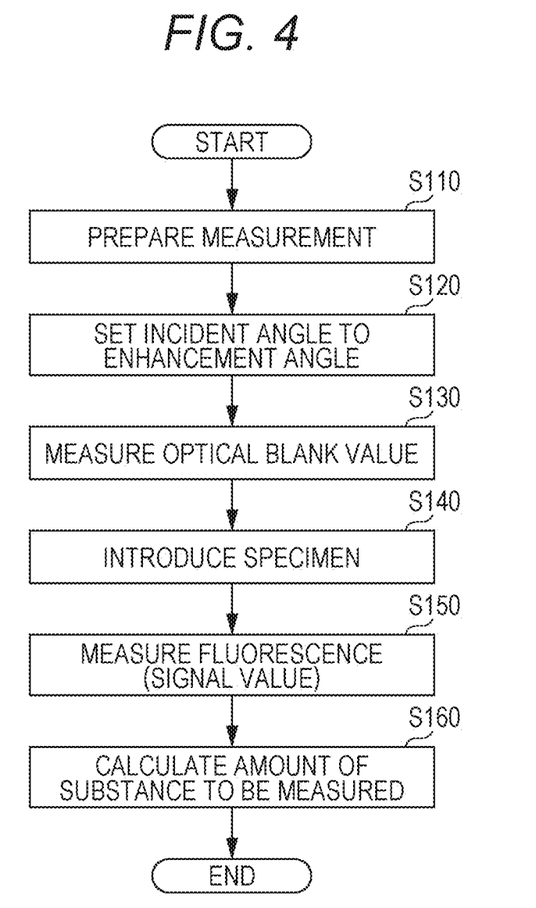
FIG. 4 is a flowchart illustrating an example of an operation procedure of a detection system when a method for detecting a detection target substance using the detection system according to the first embodiment of the present invention is performed.

The detection system 100 can be used for detecting and measuring a detection target substance. FIG. 4 is a flowchart illustrating an example of an operation procedure of the detection system 100 when a method for detecting a detection target substance using the detection system 100 according to the present embodiment is performed.

First, measurement is prepared (step S110). Specifically, the detection chip 110 is disposed at a predetermined position of the detection system 100. Thereafter, the controller 150 controls the liquid supply unit to introduce a measuring buffer solution into the liquid container 112.

Subsequently, the incident angle of the excitation light α with respect to the incident surface 118a of the LSPR structure 118 is set to an enhancement angle (step S120). Specifically, the controller 150 controls the light source unit 130 and the angle adjusting mechanism 134 to irradiate a position corresponding to the detection field 119 on the incident surface 118a of the LSPR structure 118 with the excitation light α and scans an incident angle of the excitation light α with respect to the incident surface 118a. At the same time, the controller 150 controls the detector 148 to detect the plasmon scattered light γ. At this time, the controller 150 controls the position switching unit 146 to move the optical filter 143 out of the optical path. The controller 150 obtains data including a relationship between the incident angle of the excitation light α and the intensity of the plasmon scattered light γ. Then, the controller 150 analyzes the data to determine an incidence angle (enhancement angle) at which the intensity of the plasmon scattered light γ is maximum. Finally, the controller 150 controls the angle adjusting mechanism 134 to set the incident angle of the excitation light α with respect to the incident surface 118a of the LSPR structure 118 to an enhancement angle.

The enhancement angle is determined by the material and the shape of the substrate 116, the shape and the material of the LSPR structure 118, the refractive index of a liquid in the liquid container 112, and the like but is varied slightly according to various factors such as the type and the amount of a liquid in the liquid container 112 and a shape error of the substrate 116. For this reason, the enhancement angle is preferably determined each time detection is performed. The enhancement angle can be determined on the order of, for example, about 0.1°. Incidentally, when it is desired to simplify the operation, setting of the enhancement angle (step S120) may be omitted. When the LSPR structure 118 is an aggregate of nano-sized particles, setting of the enhancement angle (step S120) can be omitted.

Subsequently, an optical blank value is measured (step S130). Specifically, the controller 150 controls the light source unit 130 to irradiate a position corresponding to the detection field 119 on the incident surface 118a of the LSPR structure 118 with the excitation light α. At the same time, the controller 150 controls the detector 148 to detect the light quantity of background light having the same wavelength as the fluorescence β. At this time, the controller 150 controls the position switching unit 146 to move the optical filter 143 onto the optical path. The controller 150 records the measured light quantity of the background light as a blank value.

Subsequently, a specimen containing a detection target substance labeled with a fluorescent substance is introduced into the liquid container 112 of the detection chip 110 (step S140).

The types of the specimen and the detection target substance are not particularly limited. Examples of the specimen include a body fluid such as blood, serum, plasma, a cerebrospinal fluid, urine, nostril, saliva, or semen, a tissue extract, and dilutions thereof. Examples of the detection target substance include a nucleic acid (DNA, RNA, or the like), a protein (a polypeptide, an oligopeptide, or the like), an amino acid, a carbohydrate, a lipid, and modified molecules thereof. Among these substances, the method for detecting a detection target substance using the detection system 100 according to the present embodiment can be more preferably used for measuring a protein and a lipid. The detection target substance may float in a specimen and may be attached to a surface of a cell or an exosome.

The detection target substance is labeled with a fluorescent substance. Labeling with a fluorescent substance can be performed by bonding a capturing body (second capturing body) carrying a fluorescent substance and specifically bonded to the detection target substance to the detection target substance.

The second capturing body only needs to be a substance specifically bonded to the detection target substance, and may be a biomolecule (for example, a monoclonal antibody, a polyclonal antibody, or a nucleic acid aptamer) specific for the detection target substance, a fragment thereof, or the like. The second capturing body may be formed of one molecule or a complex in which two or more molecules are bonded to each other.

The fluorescent substance bonded to the second capturing body is not particularly limited as long as being excited by localized field light generated on a surface of a metal film to emit fluorescence and can be various known fluorescent substances (for example, a fluorescent substance containing a rhodamine skeleton). Specific examples of the fluorescent substance include fluorescent dyes manufactured by Biotium (for example, CF Dye (trade name) 350, 405M, 532, 543, 555, 568, 594, 642, 650, 667, 663, 681, 680, 755, and 770).

Note that the fluorescent substance may have a volume average particle diameter of 200 nm or more as measured by a laser diffraction/scattering method.

The number of the fluorescent substance bonded to one second capturing body is preferably 8 or more and 22 or less, and more preferably 13 or more and 16 or less. "The number of the fluorescent substance bonded to one second capturing body" is an average value of the number of the fluorescent substance bonded to each of a plurality of the second capturing bodies supplied into the liquid container 112.

The amount of the fluorescent substance bonded to one second capturing body can be adjusted by a charging ratio between the second capturing body and the fluorescent substance, reaction time, and temperature during a reaction when the fluorescent substance is bonded to the second capturing body but is preferably adjusted by the charging ratio. The number (average value) of the fluorescent substance bonded to one second capturing body, supplied to the liquid container 112, can be obtained by measuring the absorbance of the second capturing body to which the fluorescent substance is bonded using an absorptiometer, calculating the amount of the second capturing body and the amount of the fluorescent substance, and calculating a ratio of the amount of the fluorescent substance to the amount of the second capturing body.

Labeling of the detection target substance with the fluorescent substance may be performed before a specimen is introduced into the liquid container 112. Alternatively, a specimen and the second capturing body may be separately introduced into the liquid container 112 (or a specimen containing the second capturing body may be introduced into the liquid container 112), and labeling of the detection target substance with the fluorescent substance may be performed in the liquid container 112. When labeling with the fluorescent substance is performed in the liquid container 112, the controller 150 may control the vibrator to vibrate the detection chip 110, and a liquid inside the liquid container 112 may be stirred in order to promote bonding between the detection target substance and the second capturing body. In any case, in step S140, the specimen containing the detection target substance labeled with the fluorescent substance only needs to be present in the liquid container 112.

Subsequently, a fluorescence value obtained from the fluorescent substance that labels the detection target substance is measured (step S150). Specifically, the controller 150 controls the light source unit 130 to irradiate a position corresponding to the detection field 119 on the incident surface 118a of the LSPR structure 118 with the excitation light α. At the same time, the controller 150 controls the detector 148 to detect the light quantity of light having the same wavelength as the fluorescence β. At this time, the controller 150 controls the position switching unit 146 to move the optical filter 143 onto the optical path. The controller 150 records the measured light quantity as a fluorescence value.

Finally, the amount of the detection target substance is calculated (step S160). The fluorescence value mainly includes a fluorescent component (signal value) derived from the fluorescent substance that labels the detection target substance and an optical blank value. Therefore, by subtracting the optical blank value obtained in step S130 from the fluorescence value obtained in step S150, the controller 150 can calculate a signal value correlated with the amount of the detection target substance. Then, the signal value is converted into the amount, the concentration, or the like of the detection target substance based on a calibration curve prepared in advance.

By the above procedure, the detection target substance contained in the specimen can be detected, and the amount thereof can be measured.

(Effect)

Figure 5A:
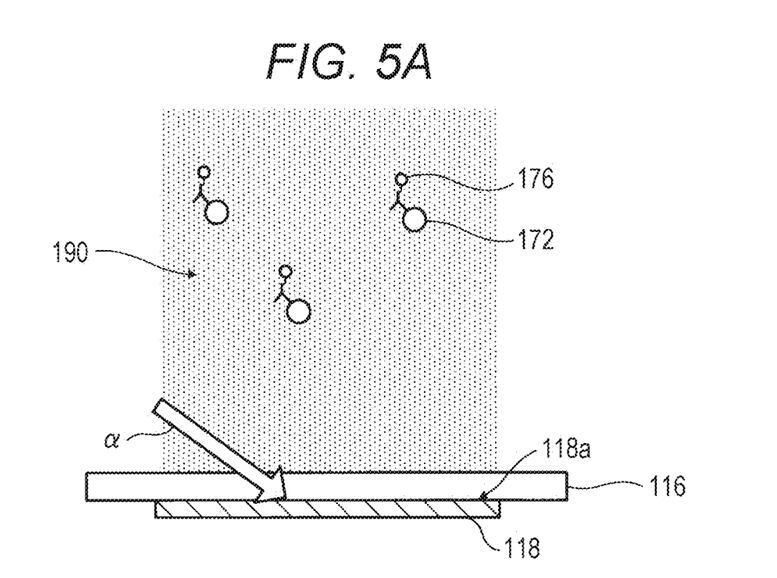
FIG. 5A is a schematic diagram illustrating a state in which a detection target substance floating in a liquid container is detected in the method for detecting a detection target substance illustrated in the flowchart of FIG. 4.
Figure 5B:
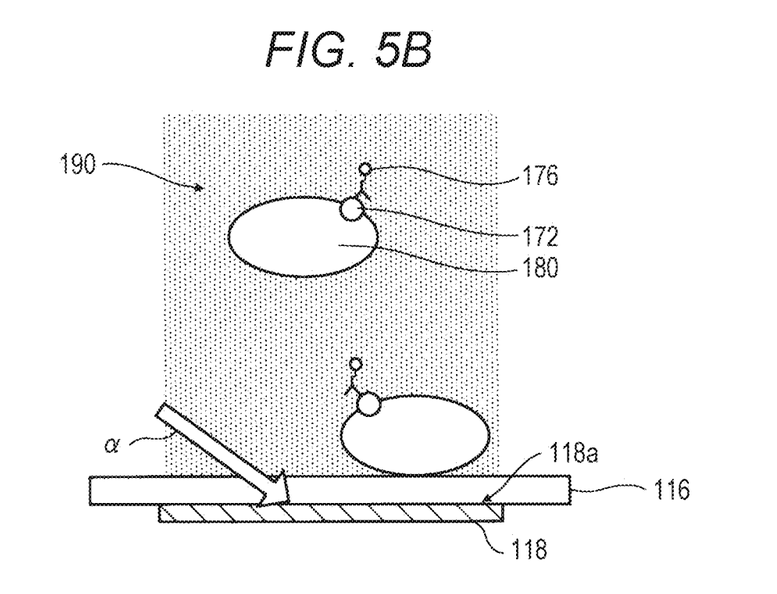
FIG. 5B is a schematic diagram illustrating a state in which a detection target substance attached to a cell or an exosome is detected in the method for detecting a detection target substance illustrated in the flowchart of FIG. 4.

In the present embodiment, an enhanced electric field 190 is generated even in a range of several hundred thousands nm (several hundreds μm) from a back surface (surface irradiated with the excitation light α: incident surface 118a) of the LSPR structure 118. Therefore, as illustrated in FIG. 5A, a detection target substance 172 (labeled with a fluorescent substance 176) floating in the liquid container 112 can also be detected and measured. Therefore, it is unnecessary to fix the detection target substance to the substrate 116. It is possible to detect the detection target substance and to measure the amount thereof with a simpler procedure. In addition, the enhanced electric field 190 is generated in a wider range than in a case where conventional surface plasmon resonance is used. Therefore, as illustrated in FIG. 5B, it is possible to measure the presence and the amount of the detection target substance 172 (labeled with the fluorescent substance 176) such as a protein or a lipid that is attached to a cell or an exosome 180, expressed in the cell, and released from the cell, or a protein presented on a surface of a macrophage which is an antigen presenting cell or the like. The cell or the exosome 180 may be attached to the substrate or may float in the liquid container 112.

Second Embodiment (Detection System)

Figure 6:
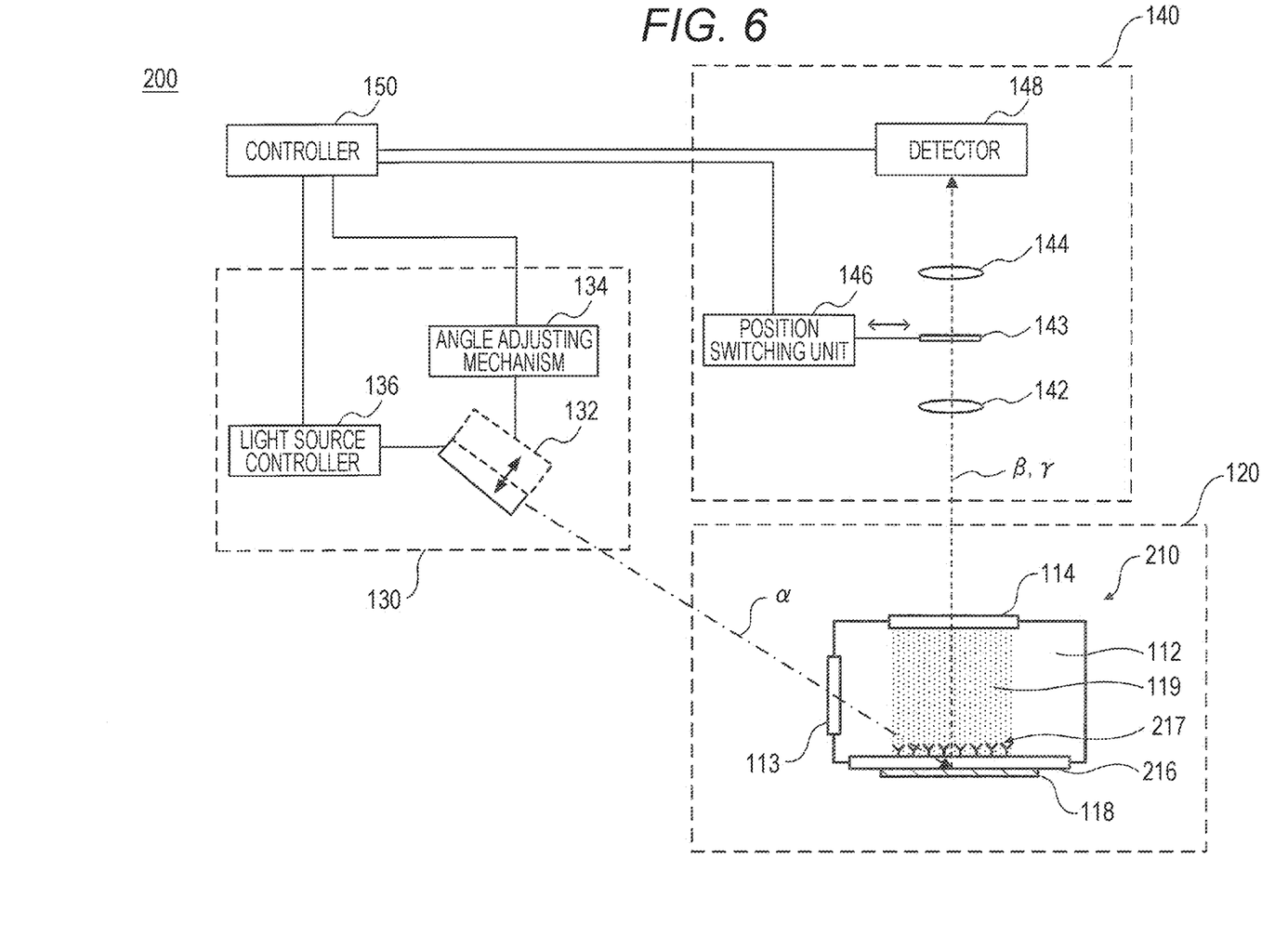
FIG. 6 is a schematic diagram illustrating the configuration of a detection system according to a second embodiment of the present invention.

FIG. 6 is a schematic diagram illustrating the configuration of a detection system 200 according to a second embodiment of the present invention. The detection system 200 includes a chip holder 120 for disposing a detection chip 210 including a liquid container 112 and a light-transmitting substrate 116, a light source unit 130, a detection unit 140, and a controller 150. The detection system 200 irradiates the detection chip 210 with excitation light α such that an LSPR structure 118 of the detection chip 210 generates LSPR in a state where the detection chip 210 is attached to a predetermined position of the chip holder 120 and generates an enhanced electric field based on LSPR on a side closer to the liquid container 112 than the LSPR structure 118. By exciting a fluorescent substance present in the liquid container 112 by the enhanced electric field and detecting the fluorescence β emitted from the fluorescent substance, a detection target substance in a specimen is detected and the amount thereof is measured.

The detection system 200 is different from the first embodiment in the configuration of the detection chip 210 and detection method. Therefore, the same reference numerals are given to the same constituent elements as those of the detection system 100 according to the first embodiment, and description thereof will be omitted.

The detection chip 210 includes the liquid container 112 and the light-transmitting substrate 216.

The liquid container 112 may have a similar configuration to the liquid container 112 according to the first embodiment.

The substrate 216 is a light-transmitting and dielectric substrate having two surfaces facing each other and made of a dielectric capable of transmitting the excitation light α. In the substrate 216, one of the two surfaces facing each other faces an inside of the liquid container 112. The substrate 216 can be formed of a material transparent to light, such as resin or glass. The substrate 216 may be a prism.

In the second embodiment, the substrate 216 has a capturing region 217 in which a capturing body (first capturing body) specifically bonded to a detection target substance is fixed to the one surface. The first capturing body is a substance having a recognition site for being specifically bonded to a detection target substance in a specimen. If the first capturing body is fixed to the substrate 216, when a specimen is introduced into the liquid container 112, a detection target substance is selectively bonded to the first capturing body, and the detection target substance is captured In a region (capturing region 217) of the one surface of the substrate 216 corresponding to a detection field 119. The type of the first capturing body is not particularly limited as long as having a recognition site for being specifically bonded to the detection target substance. Examples of the first capturing body include an antibody (primary antibody) capable of being specifically bonded to a detection target substance, a fragment thereof, and an enzyme capable of being specifically bonded to the detection target substance.

The substrate 216 includes the LSPR structure 118 that generates LSPR by irradiation with the excitation light $\alpha$ on the other surface of the two surfaces facing each other. The LSPR structure 118 is formed in at least a part of a region corresponding to the detection field 119 on the other surface. The LSPR structure 118 may have a similar configuration to the LSPR structure 118 according to the first embodiment.

The one surface (surface on which the capturing region 217 is disposed) of the substrate 216 is preferably substantially flat from a viewpoint of improving detection accuracy. That is, as in the second embodiment, in a case where the capturing region 217 is disposed on the one surface of the substrate 216, the one surface of the substrate 216 is preferably flat.

(Detection Method)

Figure 7:
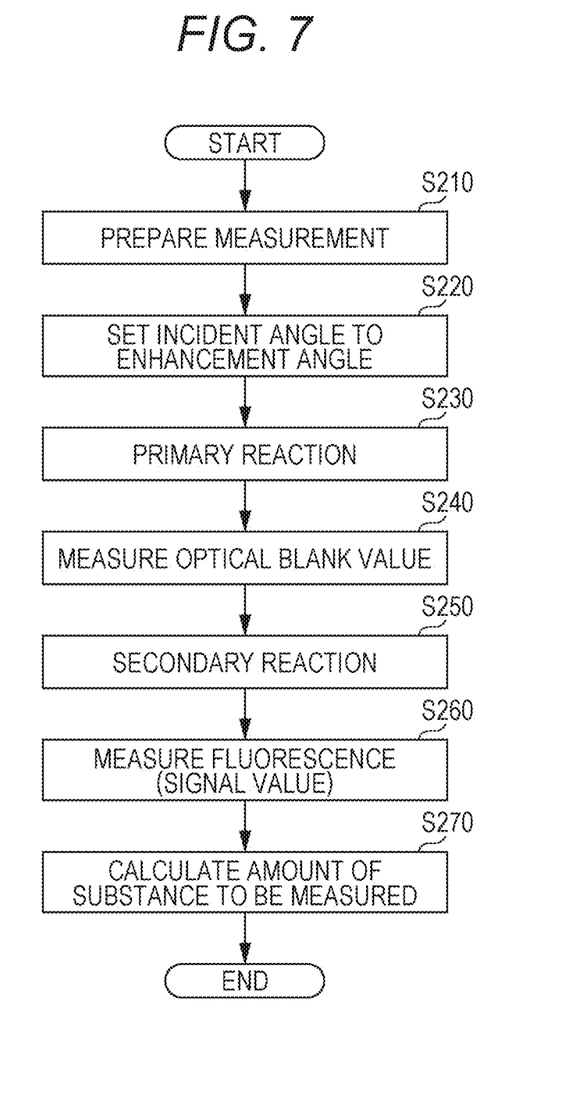
FIG. 7 is a flowchart illustrating an example of an operation procedure of a detection system when a method for detecting a detection target substance using the detection system according to the second embodiment of the present invention is performed.

FIG. 7 is a flowchart illustrating an example of an operation procedure of the detection system 200 when a method for detecting a detection target substance using the detection system 200 according to the present embodiment is performed.

First, measurement is prepared (step S210). Subsequently, the incident angle of the excitation light $\alpha$ with respect to the incident surface 118a of the LSPR structure 118 is set to an enhancement angle (step S220). Step S210 and step S220 may be performed in a similar manner to steps S120 and S220 in the first embodiment, respectively. Also in the present embodiment, when the LSPR structure 118 is an aggregate of nano-sized particles, setting of the enhancement angle (step S220) can also be omitted.

Subsequently, a specimen is supplied to the liquid container 112 of the detection chip 210, and a detection target substance contained in the specimen is specifically bonded to a first capturing body fixed onto the substrate 216 (capturing region 217) in the detection chip 210 (primary reaction (step S230)). Incidentally, after bonding of the detection target substance, a buffer solution or the like may be supplied into the liquid container 112, and the inside of the liquid container 112 may be cleaned to remove a free detection target substance or the like.

The types of the specimen and the detection target substance supplied to the liquid container 112 in the present embodiment are not particularly limited. Examples of the specimen include a body fluid such as blood, serum, plasma, urine, nostril, saliva, or semen, and dilutions thereof. Examples of the detection target substance contained in these specimens include a nucleic acid (DNA, RNA, or the like), a protein (a polypeptide, an oligopeptide, or the like), an amino acid, a carbohydrate, a lipid, and modified molecules thereof. Among these substances, the method for detecting a detection target substance using the detection system 200 according to the present embodiment can be more preferably used for measuring a protein and a lipid.

After the primary reaction, an optical blank value is measured (step S240). Specifically, the controller 150 controls the light source controller 136 to emit the excitation light $\alpha$ at an enhancement angle toward the LSPR structure 118 from the light source unit 130. At the same time, the controller 150 controls the detection unit 140 to detect the light quantity of light in the detector 148 and records the light quantity as a blank value.

Subsequently, a second capturing body labeled with a fluorescent substance is bonded to the detection target substance bonded to the first capturing body on the substrate 216 (secondary reaction (step S250)). Specifically, a labeling liquid containing the second capturing body is supplied into the liquid container 112. In the present embodiment, the second capturing body is specifically bonded to a site of a detection target substance, different from a site to which the first capturing body is specifically bonded. In addition, a fluorescent substance is bonded to the second capturing body. Therefore, when the labeling liquid is supplied to the liquid container 112, the second capturing body is specifically bonded to the detection target substance bonded to the first capturing body, and the detection target substance is indirectly labeled with the fluorescent substance. Incidentally, after labeling of the detection target substance with the fluorescent substance, a buffer solution or the like may be supplied into the liquid container 112, and the inside of the liquid container 112 may be cleaned to remove a free second capturing body or the like.

Here, the second capturing body only needs to be specifically bonded to a site different from a site where the first capturing body is specifically bonded to the detection target substance. The fluorescent substance bonded to the second capturing body only needs to be excited by an enhanced electric field generated by irradiation of the incident surface 118a of the LSPR structure 118 with the excitation light $\alpha$ to emit fluorescence. As the second capturing body and the fluorescent substance, substances similar to those in the first embodiment can be used.

Subsequently, in a state where the detection target substance labeled with the fluorescent substance is disposed on the substrate 216 (capturing region 217) via the first capturing body, the incident surface 118a of the LSPR structure 118 is irradiated with the excitation light $\alpha$ through the substrate 216 at an enhancement angle. Then, a fluorescence value obtained from the fluorescent substance that labels the detection target substance is measured (measurement step (step S260)). Specifically, the controller 150 controls the light source controller 136 to emit the excitation light $\alpha$ toward the LSPR structure 118 from the light source unit 130. At the same time, the controller 150 controls the detector 148 of the detection unit 140 to detect the light quantity of light having the same wavelength as the fluorescence $\beta$ in the detector 148.

Finally, a signal value indicating the presence or the amount of the detection target substance is calculated (step S270). The fluorescence value mainly includes a fluorescent component (signal value) derived from the fluorescent substance that labels the detection target substance and an optical blank value. Therefore, by subtracting the optical blank value obtained in step S240 from the fluorescence value obtained in step S260, the controller 150 can calculate a signal value correlated with the amount of the detection target substance. Then, the signal value is converted into the amount, the concentration, or the like of the detection target substance based on a calibration curve prepared in advance.

By the above procedure, the presence or the amount of the detection target substance contained in the specimen can be detected.

(Effect)

Also in the present embodiment, an enhanced electric field is generated even in a range of several hundred thousands nm (several hundreds μm) from a back surface (surface irradiated with the excitation light α: incident surface 118a) of the LSPR structure 118. For this reason, it is possible to detect a particulate matter larger than in the past and a detection target substance attached to a cell or an exosome (a protein or a lipid expressed in a cell and released from the cell, a protein presented on a surface of a macrophage which is an antigen presenting cell, or the like), and to measure the amount thereof. In addition, in the present embodiment, the detection target substance is captured by the first capturing body fixed to the substrate, and therefore detection and measurement with higher sensitivity are also possible.

Other Embodiments

Note that the substrate in each of the above embodiments may have a plurality of regions that is different from each other in the shape, the height, or the period of a protruding line or a protruding portion of the LSPR structure, an interval between the protruding lines or between the protruding portions, the average particle diameter (A) of nano-sized particles, or the average (B) of distances between the nano-sized particles on the same surface (the other surface). The above plurality of regions has different enhancement angles and different detectable and measurable substances from each other. Therefore, by irradiating the incident surface of the LSPR structure disposed in the plurality of regions on the same substrate with the excitation light α at different incident angles, it is possible to detect and measure a plurality of types of substances contained in a specimen with one substrate. In particular, the substrate in each of the above embodiments preferably has a plurality of regions that is different from each other in the height of a protruding line or a protruding portion or the average particle diameter (A) of nano-sized particles on the same surface (the other surface).

Alternatively, regarding the substrate, a detection kit including a plurality of substrates that is different from each other in the shape, the height, or the period of unevenness of the LSPR structure, an interval between the protruding lines or between the protruding portions, the average particle diameter (A) of nano-sized particles, or the average (B) of distances between the nano-sized particles may be used. Alternatively, regarding the detection chip, a detection kit including a plurality of detection chips including a plurality of substrates that is different from each other in the shape, the height, or the period of unevenness of the LSPR structure, an interval between the protruding lines or between the protruding portions, the average particle diameter (A) of nano-sized particles, or the average (B) of distances between the nano-sized particles may be used. Even with these detection kits, it is possible to detect and measure a plurality of types of substances contained in a specimen. In particular, the detection kit preferably includes a plurality of detection chips including substrates that are different from each other in the height of a protruding line or a protruding portion or a plurality of detection chips including substrates that are different from each other in the average particle diameter (A) of nano-sized particles.

EXAMPLES

Specific Examples of the present invention will be described below. Note that the scope of the present invention is not construed as being limited by these Examples.

Example 1

A substrate having gold nanoparticles disposed in a prism was disposed in a substrate disposition unit included in a substance detection system having the configuration illustrated in FIG. 1. The substrate was irradiated with a laser from an irradiation unit. An enhanced electric field generated on a liquid container (detection field) side at this time was calculated by calculation using a wave optical module of COMSOL Multi Physics 5.0 (manufactured by COMSOL, Inc. "COMSOL Multi Physics" is a registered trademark of COMSOL, Inc.) as a simulation software.

Figure 8:
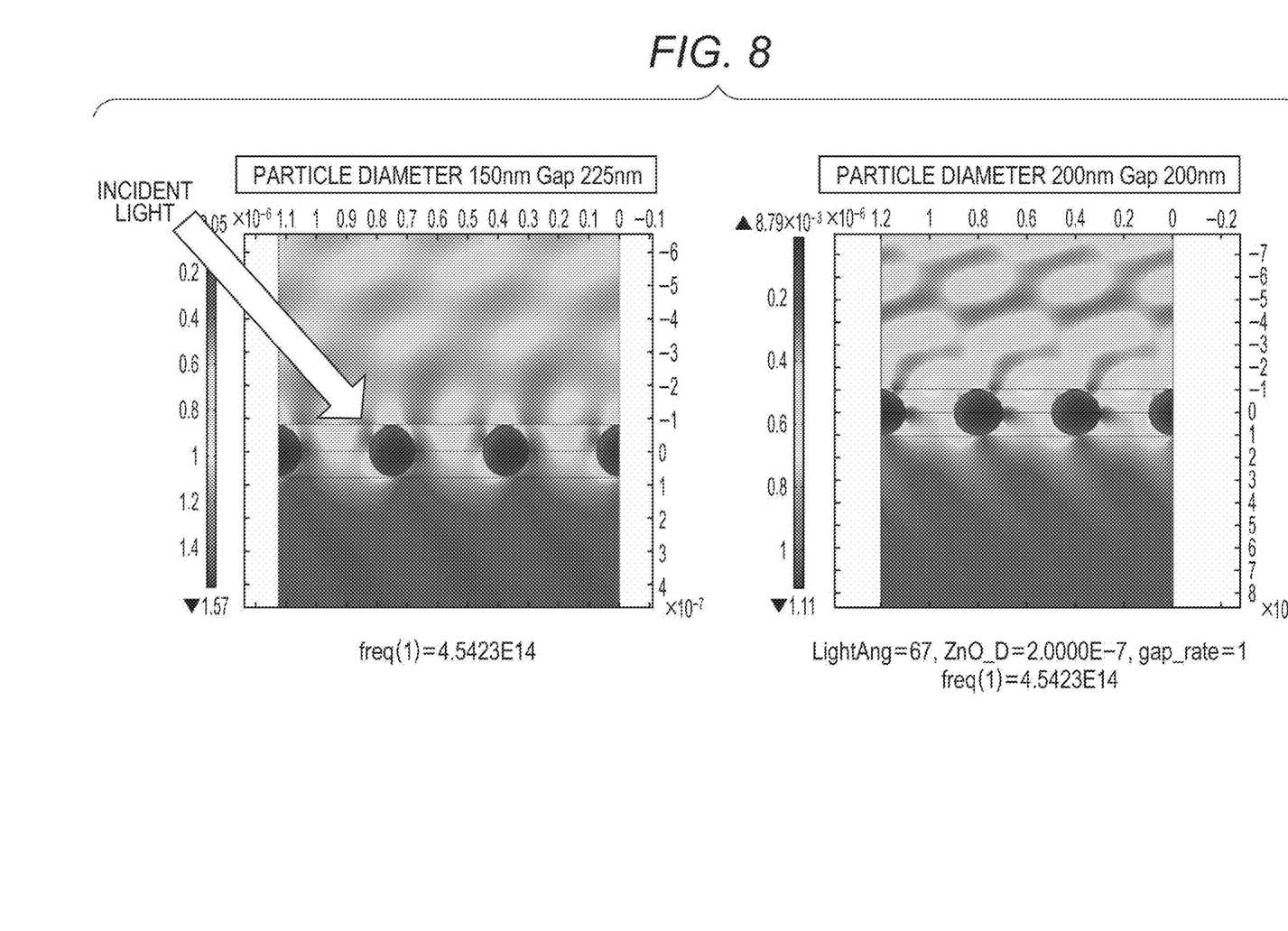
FIG. 8 is a diagram illustrating a simulation result of a distribution of an enhanced electric field in Examples of the present invention.

Results thereof are illustrated in FIG. 8. In a case where the average particle diameter (A) of the gold nanoparticles was 150 nm and the average (B) of distances between the gold nanoparticles was 225 nm (B/A=1.50) (left drawing) and in a case where the average particle diameter (A) of the gold nanoparticles was 200 nm and the average (B) of distances between the gold nanoparticles was 200 nm (B/A=1.00) (right drawing), an enhanced electric field was widely distributed on the substrate side.

From this result, it can be understood that a detection target substance labeled with a fluorescent substance by LSPR can be satisfactorily detected on a back side (the same side as irradiation with the excitation light α: incident surface side) of an LSPR structure (gold nanoparticles) on the substrate.

Example 2

1. Manufacture of Substrate

Myristic add as an amphiphilic compound and gold nanoparticles having an average particle diameter of 150 nm were put in a toluene solution and mixed to manufacture a gold nanoparticle solution.

Water was put in a film forming portion of a fully automatic LB film forming device to form a water bath, and a prism was immersed therein. The toluene solution was dropped on a top of the water bath to form a monomolecular film of the gold nanoparticles. Subsequently, the immersed prism was withdrawn to obtain a substrate 1 having the gold nanoparticles disposed on the prism.

The average (B) of distances between the nano-sized particles on the substrate 1 was measured using a known image analysis software based on an image obtained by cutting a part of the substrate 1 with a focused ion beam device (FIB) and imaging a cross section formed by imaging with SEM.

By changing the average particle diameter of the gold nanoparticles input or the speed of withdrawing the prism, substrates 2 to 7 that are different from each other in the average particle diameter (A) of the gold nanoparticles or the average (B) of distances between the gold nanoparticles were obtained.

2. Detection Target Substance

An exosome standard (Cosmo Bio) was diluted with PBS. Subsequently, an Anti CD9 Mouse antibody (antibody labeled with a fluorescent substance, hereinafter referred to as "dye-labeled antibody") labeled with a protein labeling kit Alexa Fluor 633 (manufactured by Thermo Fisher Scientific K.K., "Alexa Fluor" is a registered trademark of Molecular Probes, Inc.) was added thereto. The resulting mixture was shaken and stirred for 30 minutes, and the dye-labeled antibody was bonded to the exosome.

Thereafter, the dye-labeled antibody bonded to the exosome was separated from an unreacted dye-labeled antibody using ExoCap Kits for Serum Plasma (manufactured by JSR Life Science Co., Ltd., "ExoCap" is a registered trademark of JSR Life Science Co., Ltd.). A pellet obtained from the isolation kit was dispersed again in 2 ml of PBS to obtain an exosome dispersion.

3. Detection and Measurement (Tests 1 to 6)

Each of substrates 1 to 6 was disposed on a substrate disposition unit of a substance detection system having the configuration illustrated in FIG. 1, and the above exosome dispersion was introduced into a detection field (flow cell).

Thereafter, the substrate was irradiated with a laser from an irradiation unit, and the fluorescence intensity In the detection field was measured by a measurement unit. Detectability was evaluated according to the following criteria based on the measurement results.

○: A signal of 1.10 times or more a signal obtained with an optical blank signal was obtained ×: A signal of less than 1.10 times a signal obtained with an optical blank signal was obtained (Test 7)

The substrate 1 was disposed on a substrate disposition unit included in a substance detection system configured similarly except that a laser was emitted from the opposite side to the detection field, the exosome dispersion was introduced into the detection field (flow cell), and the substrate was irradiated with a laser. Detectability was similarly evaluated.

The average particle diameter (A) of the gold nanoparticles, the average (B) of distances between the gold nanoparticles, and evaluation results of detectability in Tests 1 to 7 are illustrated in Table 1.

TABLE 1

| Test | Substrate | Average particle diameter (A) (nm) | Average (B) of distances between particles (nm) | B/A | Detectability |
|---|---|---|---|---|---|
| Test 1 | Substrate 1 | 150 | 225 | 1.50 | ○ |
| Test 2 | Substrate 2 | 200 | 200 | 1.00 | ○ |
| Test 3 | Substrate 3 | 300 | 50 | 0.17 | ○ |
| Test 4 | Substrate 4 | 300 | 1000 | 3.33 | ○ |
| Test 5 | Substrate 5 | 600 | 450 | 0.75 | ○ |
| Test 6 | Substrate 6 | 800 | 650 | 0.81 | ○ |
| Test 7 | Substrate 1 | 150 | 225 | 1.50 | × |

As illustrated in Tests 1 to 6, the substance detection system having the configuration illustrated in FIG. 1 made it possible to satisfactorily perform detection of a detection target substance by LSPR.

Example 3

1. Preparation of Cell Slurry

In a petri dish including a light-transmitting and dielectric material, a mixture of 500 ml of a cell culture solution MEM Alpha basic (1×) manufactured by Life Technologies and 50 ml of fetal bovine serum was used as a cell culture solution. Cells derived from a mouse osteoblast (MC3T3E1 having a size of about 10 μm to 30 μm) were added to 3 ml of the cell culture solution so as to obtain a concentration of 6000 cells/ml. The cell culture solution after addition of the cells was kept warm at 40° C. for 24 hours.

Thereafter, trypsin was added to the cell culture solution, and the cells were peeled from a culture container. The cell culture solution was further added so as to obtain a concentration of 6000 cells/ml to prepare a cell slurry.

2. Manufacture of Dye-Labeled Antibody

An Anti-CD47 Mouse-Mono (B6H12) was labeled using a protein labeling kit Alexa Fluor 633 (manufactured by Thermo Fisher Scientific K.K.).

3. Bonding of Dye-Labeled Antibody to Cells

The dye-labeled antibody (CD47) manufactured above was added to the cell slurry, and the resulting mixture was shaken and stirred for 30 minutes. Thereafter, centrifugation was performed at 800 rpm for five minutes, and the supernatant was removed by decantation to separate CD47 bonded to cells from unreacted CD47. To the resulting precipitate, a cell culture medium was added such that the cell number became 6000 cells/ml, and dispersion was performed by pipetting.

4. Detection and Measurement

A petri dish in which the cells were dispersed was disposed in a substrate disposition unit included in the substance detection system illustrated in FIG. 1.

Thereafter, the petri dish was irradiated with a laser from an irradiation unit, and the fluorescence intensity was measured by a measurement unit. As a result, a signal of 1.10 times or more the signal obtained with the optical blank signal was obtained. The substance detection system having the configuration illustrated in FIG. 1 made it possible to satisfactorily perform detection of a substance present in a region apart from the substrate, such as a substance attached to a surface of a cell, by LSPR.

According to the present invention, SPRF can be performed by making an enhanced electric field wider than in the past, and therefore it is also possible to detect and measure a substance floating in a liquid container, a substance attached to a surface of a cell, and the like. In addition, according to the present invention, it is also possible to detect and measure a substance by SPRF using a fluorescent substance having a larger average particle diameter. Therefore, the present invention is expected to expand a range to which SPRF can be applied.

Although embodiments of the present invention have been described and illustrated in detail, the disclosed embodiments are made for purposes of illustration and example only and not limitation. The scope of the present invention should be interpreted by terms of the appended claims.

What is claimed is:

1. A detection chip comprising:
    a liquid container; and
    a light-transmitting substrate in which one of two surfaces facing each other faces an inside of the liquid container and an LSPR structure that generates localized surface plasmon resonance by light irradiation is disposed on the other surface of the two surfaces or in a region sandwiched between the one surface and the other surface,
    wherein the liquid container includes an excitation light transmitting portion that allows excitation light entering the liquid container through the excitation light transmitting portion to be incident on the one surface of the substrate, and a fluorescence transmitting portion that allows fluorescent light emitted by a fluorescent substance to exit the liquid container through the fluorescence transmitting portion, the fluorescence transmitting portion being disposed in a region on a side surface of the liquid container facing the light transmitting substrate and the excitation light transmitting portion being disposed in a separate region in which the excitation light can be incident on the substrate at an angle at which the light quantity of scattered light having the same wavelength as the excitation light is a maximum.

2. The detection chip according to claim 1, wherein the LSPR structure has an uneven structure including a plurality of protruding lines or protruding portions formed outside the other surface of the substrate.

3. The detection chip according to claim 2, wherein the LSPR structure has an uneven structure having a protruding line or a protruding portion with a height of 5 nm or more.

4. The detection chip according to claim 2, wherein the LSPR structure has a plurality of regions that is different from each other in the average of the heights of the protruding lines or the protruding portions.

5. The detection chip according to claim 1, wherein the LSPR structure is an aggregate of nano-sized particles.

6. The detection chip according to claim 5, wherein the nano-sized particles have an average particle diameter (A) of 5 nm or more and 1000 nm or less.

7. The detection chip according to claim 5, wherein the LSPR structure has a ratio (B/A) of an average particle diameter (A) of the nano-sized particles to an average (B) of distances between the nano-sized particles of 0.3 or more and 3.0 or less.

8. The detection chip according to claim 5, wherein the LSPR structure has a plurality of regions that is different from each other in an average particle diameter (A) of the nano-sized particles.

9. The detection chip according to claim 1, wherein the LSPR structure contains a metal or a metal oxide selected from the group consisting of gold, silver, zinc oxide, titanium nitride, and indium oxide.

10. The detection chip according to claim 1, wherein the substrate has a first capturing body for capturing a detection target substance on the other surface of the two surfaces.

11. A detection kit comprising a plurality of the detection chips according to claim 2, different from each other in an average of the heights of the protruding lines or the protruding portions of the LSPR structure having the uneven structure.

12. A detection kit comprising a plurality of the detection chips according to claim 5, different from each other in an average particle diameter (A) of the nano-sized particles of the LSPR structure formed of the nano-sized particles.

13. A detection system comprising:
the detection chip according to claim 1;
a light source that irradiates the LSPR structure with excitation light that generates localized surface plasmon resonance in the LSPR structure from the liquid container side through the substrate; and
a detector that detects fluorescence emitted from a fluorescent substance that labels a detection target substance with the fluorescent substance by irradiation with the excitation light.

14. The detection system according to claim 13, wherein the light source emits a laser.

15. A method for detecting a detection target substance, the method comprising:
using the detection chip according to claim 1, in which a detection target substance labeled with a fluorescent substance is housed in the liquid container,
irradiating the LSPR structure with excitation light that generates localized surface plasmon resonance from the liquid container side through the substrate; and
detecting fluorescence emitted from the fluorescent substance by irradiation with the excitation light.

16. The detection method according to claim 15, wherein the excitation light is a laser.

17. The detection method according to claim 15, wherein the substrate includes a first capturing body that captures a detection target substance on the other surface, and
the method comprises bonding a second capturing body labeled with a fluorescent substance to the detection target substance bonded to the first capturing body before the irradiation.

18. The detection method according to claim 15, wherein the detection target substance labeled with the fluorescent substance floats in the liquid container.

19. The detection method according to claim 15, wherein the detection target substance is a compound attached to a cell or an exosome.

20. The detection method according to claim 15, wherein the detection target substance is a protein or a lipid.

* * * * *